United States Patent [19]
Thompson

[11] Patent Number: 5,807,593
[45] Date of Patent: Sep. 15, 1998

[54] VACUUM BAG NOT REQUIRING DISPOSABLE BREATHERS

[75] Inventor: Michael P. Thompson, Tacoma, Wash.

[73] Assignee: The Boeing Company, Seattle, Wash.

[21] Appl. No.: 680,334

[22] Filed: Jul. 10, 1996

[51] Int. Cl.⁶ ................................................. B29C 70/44
[52] U.S. Cl. ..................... 425/389; 264/316; 264/571; 425/DIG. 44
[58] Field of Search .................... 425/389, 504, 425/DIG. 44; 264/316, 510, 571

[56] References Cited

U.S. PATENT DOCUMENTS

| | | | |
|---|---|---|---|
| 4,132,755 | 1/1979 | Johnson | 425/389 |
| 4,548,859 | 10/1985 | Kline et al. | 442/312 |
| 4,676,853 | 6/1987 | Lerma | 264/316 |
| 4,698,115 | 10/1987 | Dodds | 156/382 |
| 4,822,436 | 4/1989 | Callis et al. | 264/571 |
| 4,975,311 | 12/1990 | Lindgren | 428/156 |
| 5,129,813 | 7/1992 | Shepherd | 425/504 |
| 5,316,462 | 5/1994 | Seeman | 425/389 |
| 5,370,598 | 12/1994 | Corneau, Jr. | 493/220 |
| 5,536,767 | 7/1996 | McGuiness et al. | 264/510 |

FOREIGN PATENT DOCUMENTS

| | | | |
|---|---|---|---|
| 2073648 | 10/1981 | United Kingdom | 264/571 |

*Primary Examiner*—Robert Davis
*Attorney, Agent, or Firm*—Conrad O. Gardner

[57] ABSTRACT

A process and method for manufacturing fiber reinforced composite structures without trapping volatiles in the resin matrix. Volatiles from the curing cycle are absorbed into a silicone rubber layer, and a gas impermeable barrier layer outside the silicone rubber layer prevents autoclave atmosphere from permeating into the part. The process is to layer the finished ply build-up, with a ply of FEP (fluorinated ethylene propylene), a layer of silicone rubber to absorb the volatiles, and a layer of impermeable elastomer. The layer of fluoroelastomer is bonded to the silicone rubber to form a reusable, impermeable elastomeric vacuum bag, eliminating the need for disposable edge and surface breathers.

2 Claims, 2 Drawing Sheets

VACUUM BAG NOT REQUIRING DISPOSABLE BREATHERS

BACKGROUND OF THE INVENTION

1. Field of the Invention

The present invention relates to vacuum bag tools and more particularly to a reusable silicone rubber vacuum bag not requiring the use of disposable edge and surface breather materials.

2. Background Information

Reusable silicone vacuum bags, which replace nylon vacuum bags and edge sealant, have been developed and are commonly used.

Exemplary of prior art vacuum bag tools utilizing a silicone rubber sheet as the bag is U.S. Pat. No. 4,698,115 to Dodds, issued Oct. 6, 1987 and assigned to The Boeing Company.

Also illustrative of the prior art unitary vacuum bags for forming fiber reinforced composite articles is U.S. Pat. No. 5,316,462 to Seeman, issued May 3, 1994.

SUMMARY OF THE INVENTION

An embodiment of the invention comprises a reusable vacuum bag which eliminates the heretofore used absorption blanket with attendant disposal cost. A custom made breather for every part produced is no longer required in accordance with the present invention wherein the finished ply build-up is layered first with a ply of fluorinated ethylene propylene, then a further layer of silicone rubber to absorb volatiles and transfer pressure and yet a further layer of impermeable elastomeric layer bonded to the further layer.

BRIEF DESCRIPTION OF THE DRAWING(S)

DETAILED DESCRIPTION OF THE INVENTION

Problem Solved by the Invention

Problem Solved by the Invention

Figure 1:
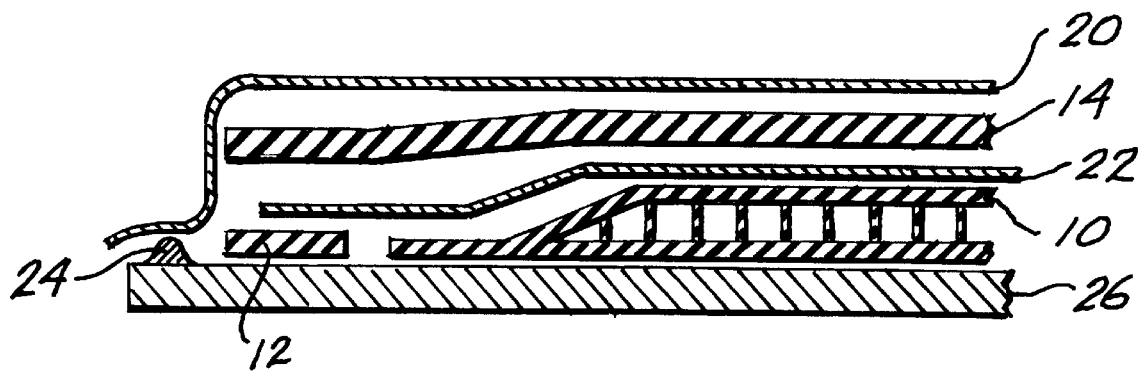
FIG. 1 is a cross sectional view of a conventional vacuum bag.

Conventional vacuum bags for composite aircraft parts require breather material, typically a polyester felt-type material, to be cut to size and used above the parting film in the vacuum bag (see FIG. 1). A strip of breather material is laid around the part 10 periphery (edge breather 12), and another piece (or pieces for large parts) is cut to the shape of the part and laid over the part surface (surface breather 14). The breathers are intended to allow gas flow inside nylon vacuum bag 20, even under autoclave pressure. A vacuum line is connected into vacuum bag 20. A parting film 22 comprising a fluorinated ethylene propylene is disposed intermediate composite part 10 and surface breather 14, an edge sealant 24 being used to seal vacuum bag 20 to bag tool 26.

In contrast to the above, the present invention, a reusable breather/vacuum bag, eliminates the need to custom-make the edge and surface breathers for every part produced. This produces among other advantages hereinafter described, a labor savings, material cost savings, and material disposal savings.

DESCRIPTION OF THE PREFERRED EMBODIMENT(S)

Recent test parts have revealed the following about how vacuum bags work to make high-quality composite parts:

a) A barrier ply (nylon or TEDLAR, a polyvinylfluoride, registered trademark of The DuPont Company, for example) or a breather layer must be used to prevent the autoclave atmosphere from permeating into the part. Silicone rubber and typical parting film material (fluorinated ethylene propylene) will not perform adequately as a barrier ply.

b) Part volatiles must leave the surface of the part to produce a high-quality part. The volatiles will pass through the FEP (fluorinated ethylene propylene) layer, and can be taken away via a conventional breather material. As recently discovered, however, and in accordance with hereinafter described embodiments, volatile release in many parts is of sufficiently low quantity that the volatiles can be absorbed by a layer of reusable silicone rubber. The silicone rubber layer is satisfactory as long as a barrier layer is outside it to keep out the autoclave atmosphere. This eliminates the need for the disposable edge and surface breathers.

Based on these findings, and in accordance with embodiments of the present invention, a silicone rubber layer with a suitable barrier outside it will provide a one-step breather and vacuum bag application. Three embodiments are shown in FIGS. 2, 3 and 4

Figure 2:
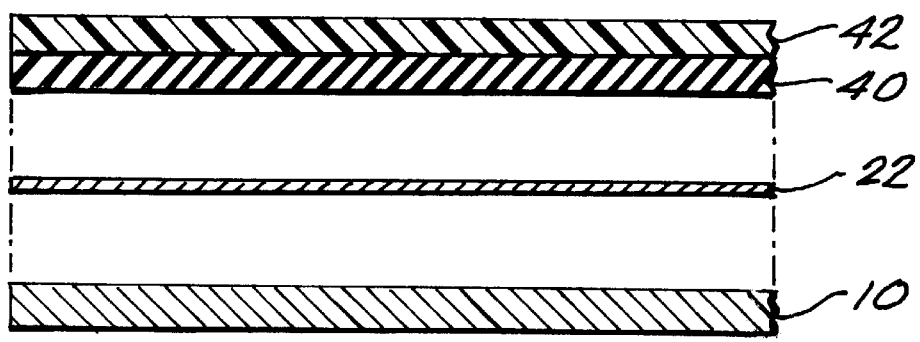
FIG. 2 is a cross sectional view of a first embodiment of a one step breather and vacuum bag according to the invention.
Figure 3:
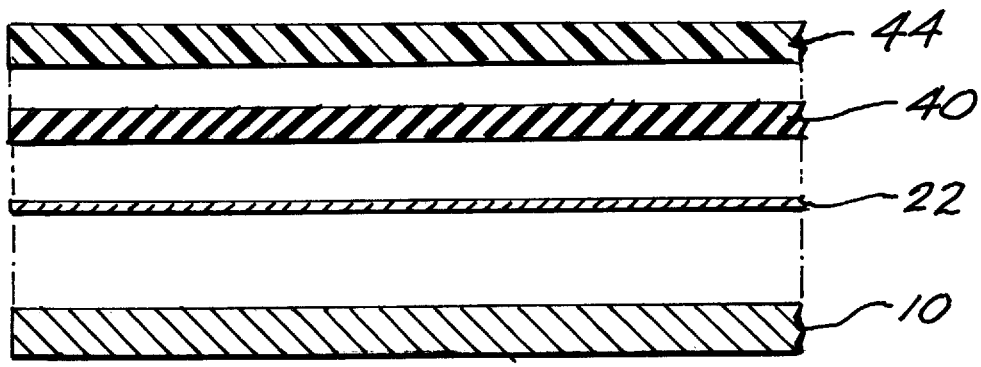
FIG. 3 is a cross sectional view of a second embodiment of a one step breather and vacuum bag according to the present invention; and, FIG. 4 is a cross sectional view of a third embodiment of a one step breather and vacuum bag according to the present invention.
Figure 4:
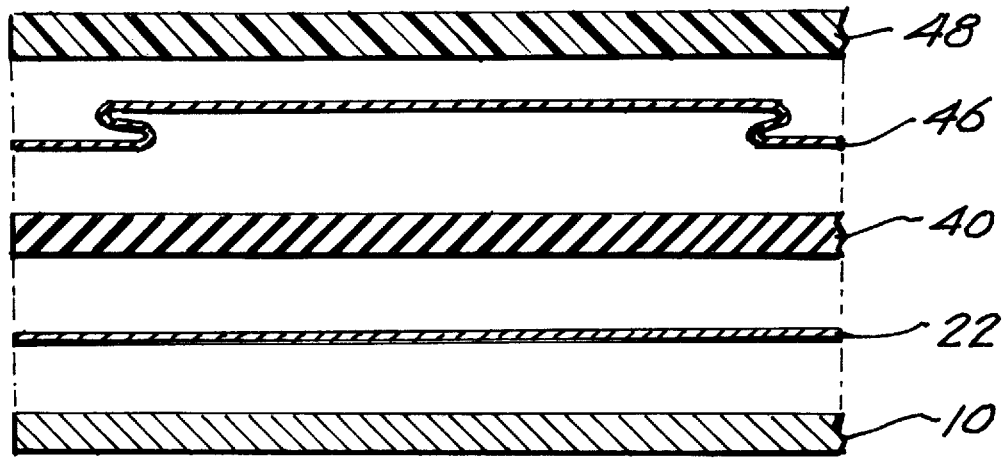

In accordance with the embodiments shown in FIG. 2, 3 and 4, a vacuum bag comprises a parting film 22 comprising a fluorinated ethylene propylene disposed intermediate part 10 and silicone rubber layer 40 for absorbing volatiles. The embodiment of FIG. 2 includes a further impermeable elastomeric layer (e.g., VITON, registered trademark of The DuPont Company) 42 (not silicone) bonded to silicone rubber layer 40. The embodiment of FIG. 3 includes further silicone rubber layer 44 with additive, e.g. polyimide, or a modified silicone rubber formulation, to make silicone rubber layer 44 impermeable. Layers 44 and 40 shown in the embodiment of FIG. 3 may be bonded over entire part 10 surface or just around the periphery. It is also possible that layers 44 and 40 can be combined into a single layer, i.e. a silicone modified or filled to be impermeable, but still able to perform the volatile absorption function. In the embodiment of FIG. 4, an impermeable plastic or coated fabric 46 is disposed between inner silicone rubber layer 22 for absorbing volatiles and outer silicone rubber layer 48. Impermeable plastic or coated fabric 46 is pleated and folded to provide excess material so it can stretch with outer silicone rubber layers 40 and 48.

What is claimed is:

1. A vacuum bagging assembly for use in applying pressure to a layup of composite material, including a vacuum bag not requiring disposable breathers for autoclave use, comprising:

a protective parting film covering the composite material;

a vacuum bag comprising in combination a reusable layer of elastomeric material to conform to part contour and transmit autoclave pressure to the composite material and a reusable impermeable layer integrally incorporated into the vacuum bag, wherein said reusable layer of elastomeric material is disposed between the parting film and the reusable impermeable layer; and an autoclave enclosing the vacuum bag.

2. The vacuum bagging assembly according to claim 1 wherein said reusable layer of elastomeric material comprises silicone rubber.

* * * * *